Patented May 27, 1941

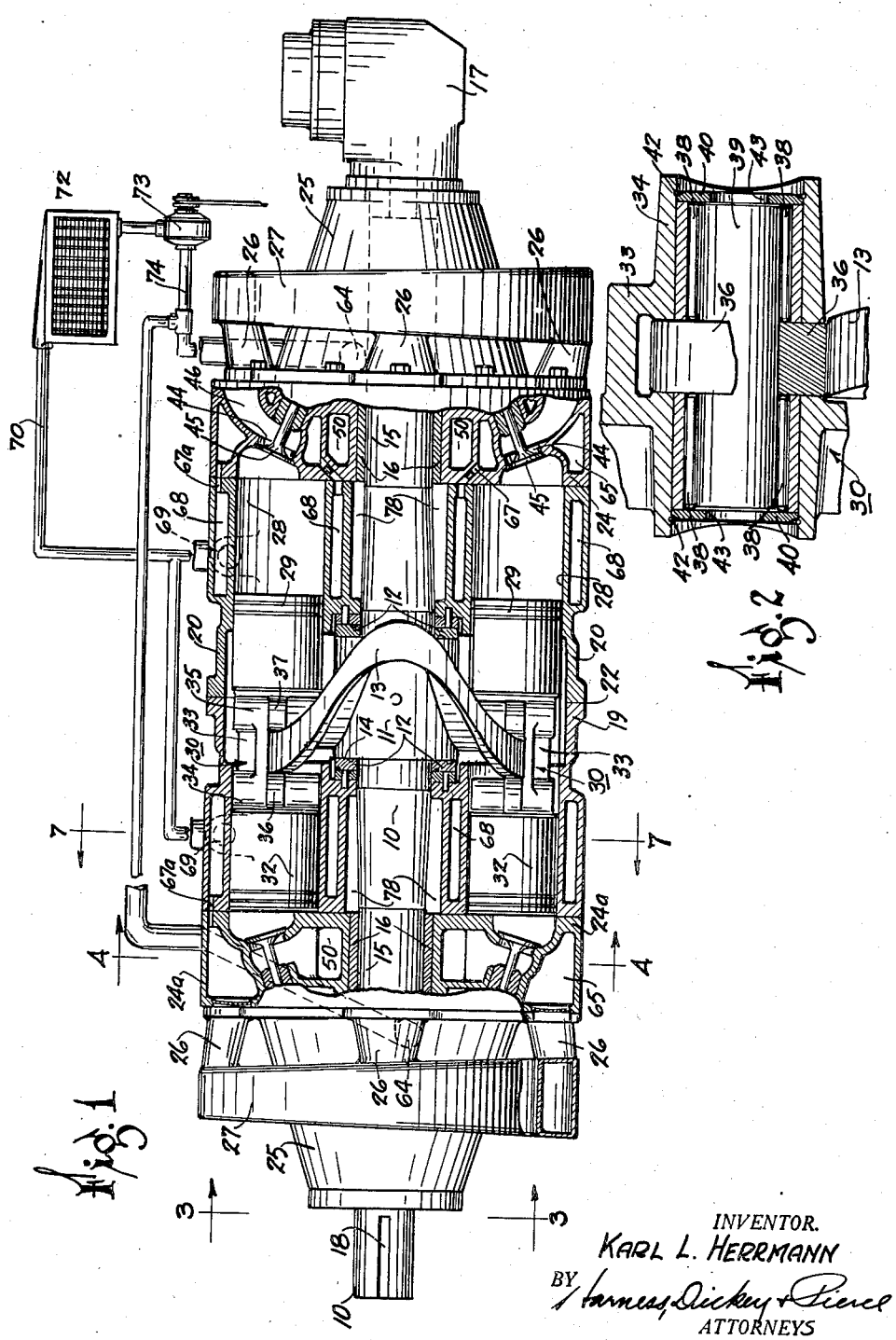

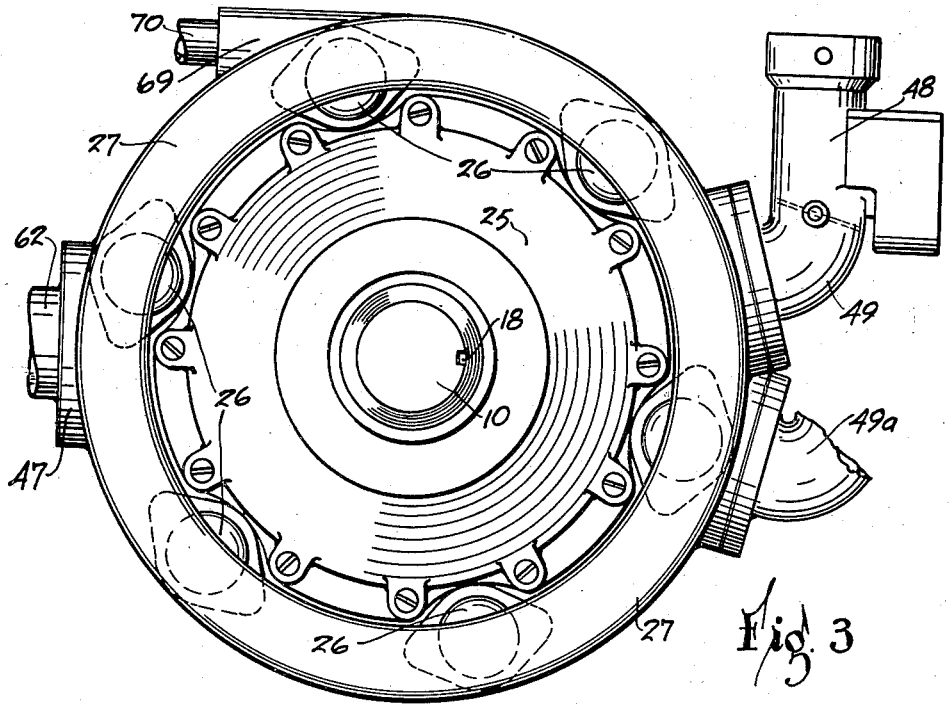
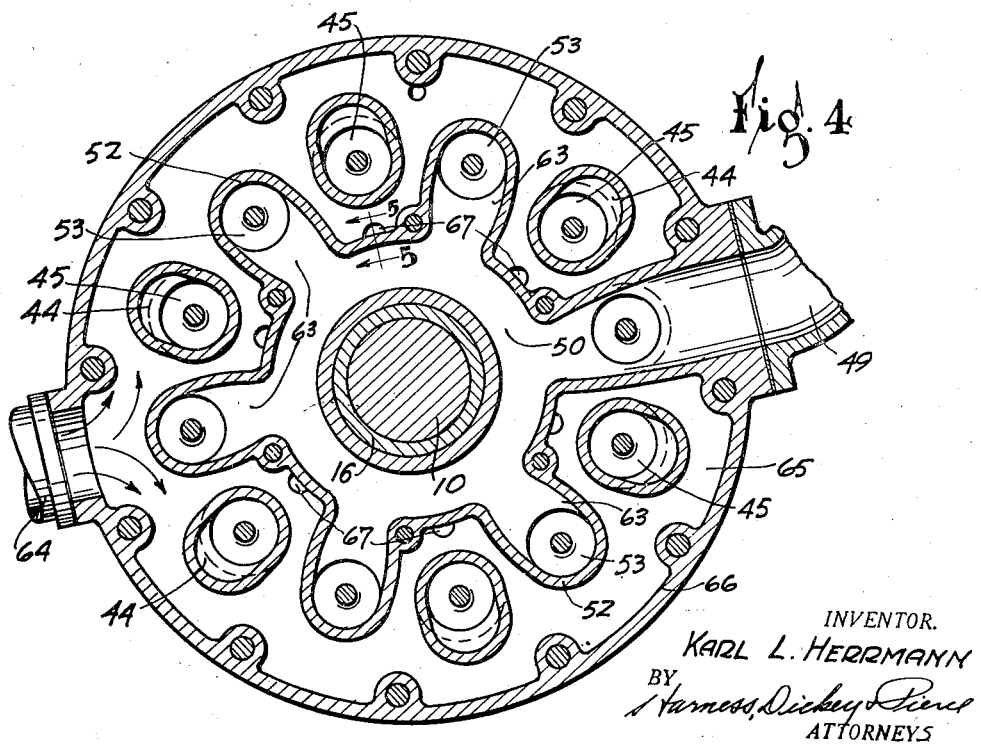

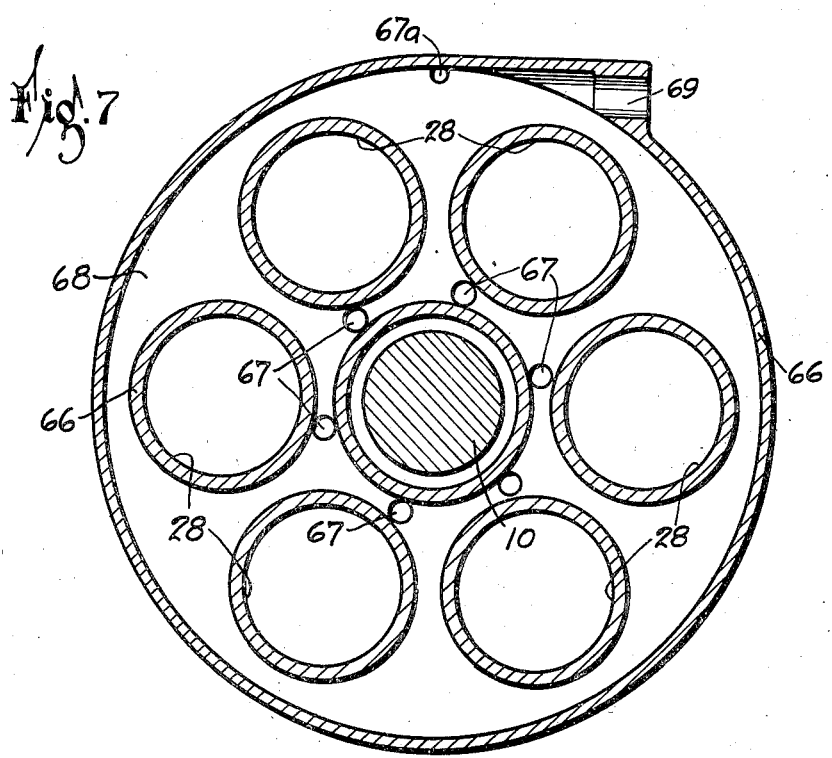
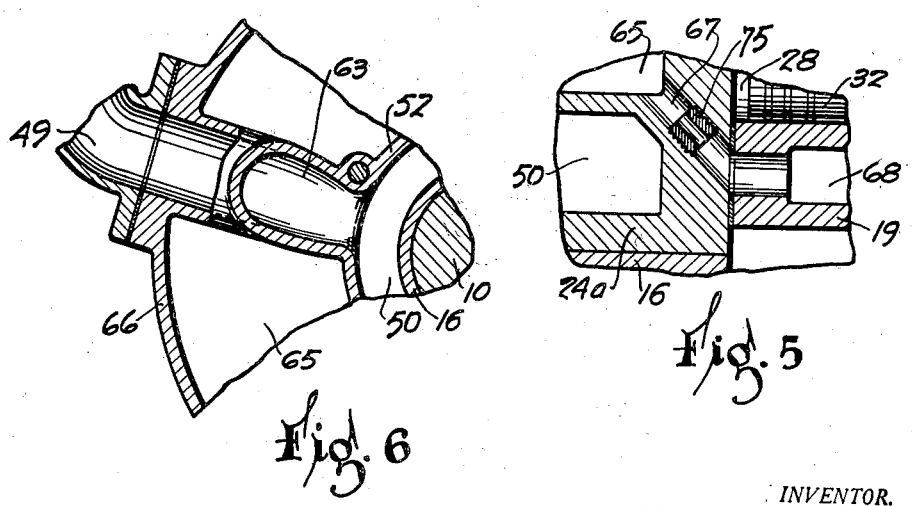

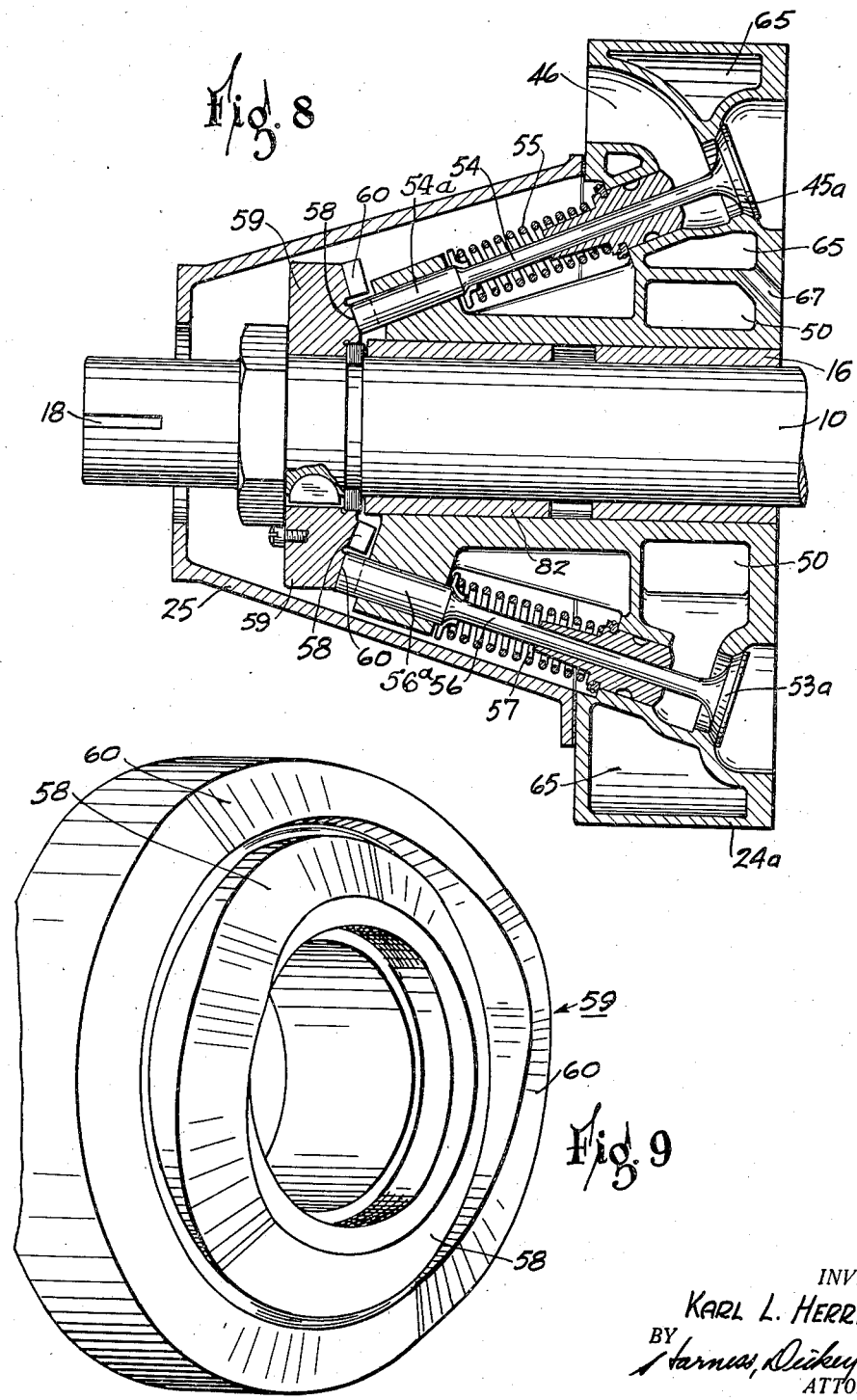

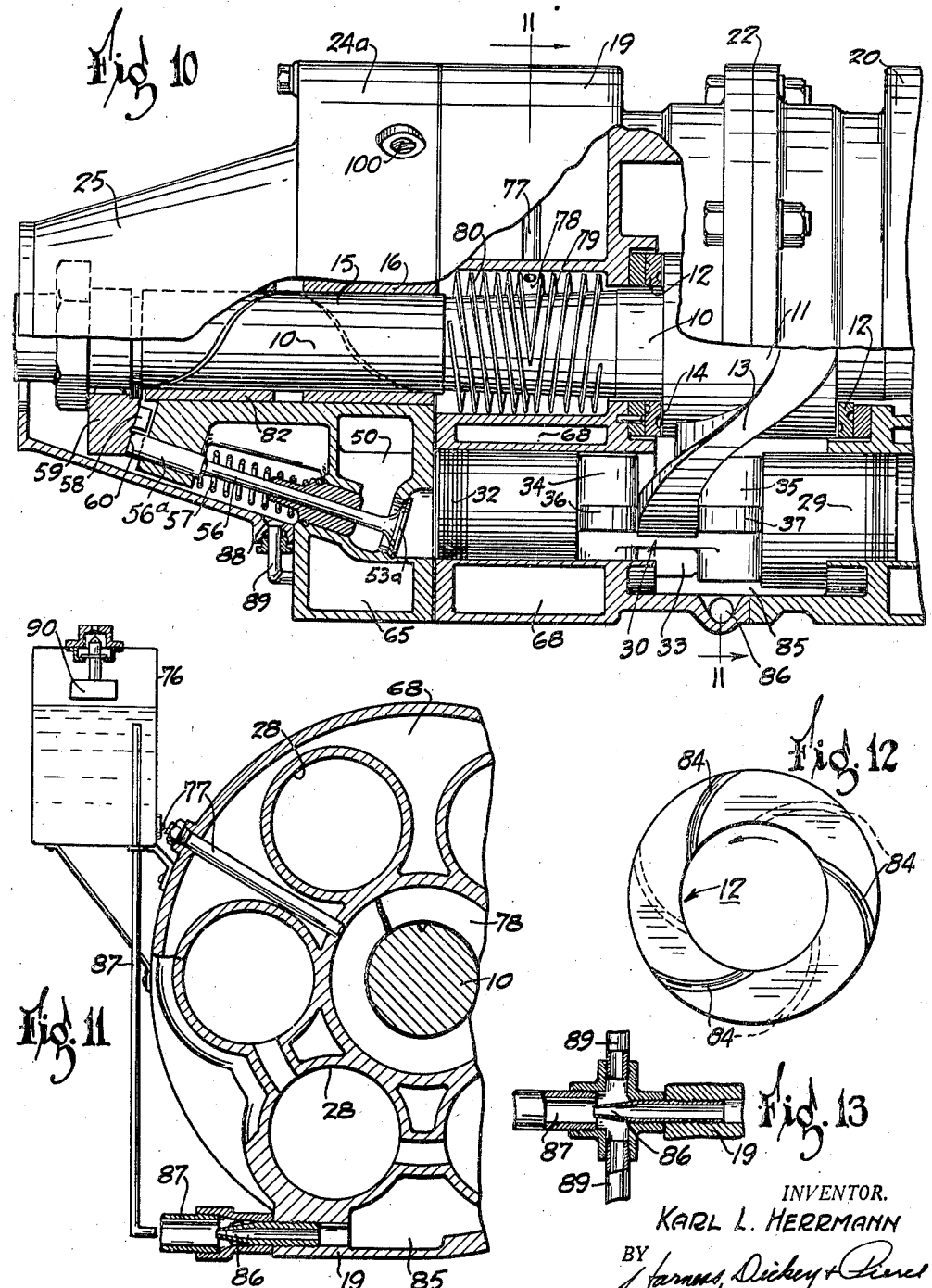

2,243,819

UNITED STATES PATENT OFFICE 2,243,819

INTERNAL COMBUSTION ENGINE

Karl L. Herrmann, South Bend, Ind.

Original application May 14, 1937, Serial No. 142,653. Divided and this application May 6, 1940, Serial No. 333,518

13 Claims. (Cl. 123—196)

This invention relates to internal combustion engines, the principal object being the provision of a new and novel lubricating system for the same.

Objects of the invention include the provision of a novel construction for distributing the lubricant to the essential bearing surfaces of a barrel type engine; the provision of a barrel type engine including a shaft having a driving cam located intermediate the ends thereof and thrust bearings associated with each end of the driving cam for the purpose of taking the thrust of the pistons on the cam, together with the novel means for lubricating the thrust bearings and for distributing lubricant therefrom to the cams and the connection between the cam and the pistons; the provision of an engine as above described in which the thrust bearings are designed to assist in the functioning of the lubrication system by submitting lubricant delivered to it to the effects of centrifugal force, thereby to enhance the flow of lubricant in the system; the provision of an engine of the type described provided with a compartment surrounding the drive shaft on each side of the cam thereof, the shaft within each of the compartments being provided with spirally arranged means adapted to force the lubricant introduced into the compartment in opposite directions to bearing surfaces located at opposite ends of each compartment; the provision of an engine of the type described in which the thrust bearings are provided with spiral grooves therein not only to distribute the lubricant over the entire face of the thrust bearings but further serving as a metering passage for delivering lubricant to the wearing surfaces between the pistons and the cams and between the pistons and the cylinders and for subjecting the lubricant to the effects of centrifugal force.

Further objects of the invention include the provision of a lubricating system for an internal combustion engine in which pressure created by blow-by past the pistons in utilized in the provision of an oil circulating system; the provision of an internal combustion engine lubricating system in which the blow-by past the pistons is combined and discharged through an ejecting device serving to transfer lubricant collecting in the engine to a reservoir from which the lubricant may be returned under gravity or otherwise to the wearing surfaces of the engine; and the provision of a lubricating system for an internal combustion engine having cylinders and a case connected therewith in which the drive shaft of the engine is rotatably supported and within which means are provided for connecting the pistons to the drive shaft, and in which lubricant introduced into the engine for the purpose of lubricating the moving parts thereof is drained into the bottom of the case, the blow-by past the pistons discharged into the case being discharged from the case in such a manner as to eject the accumulated lubricant from the case and to a suitable reservoir from which it may again be delivered to the wearing parts of the engine.

The above being among the objects of the present invention, the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a view showing parts in side elevation and other parts in vertical section and disclosing a barrel type of internal combustion engine constructed according to my invention;

Fig. 2 is a fragmentary sectional view, showing on an enlarged scale the construction of the thrust bearing and of the cam follower, which are carried in the connecting section of one of the double-ended pistons;

Fig. 3 is a view, in end elevation, taken in the direction of the arrows 3—3 of Fig. 2 and showing the exhaust manifold cover, carburetor and water outlet on an enlarged scale;

Fig. 4 is a sectional view, taken on the line 4—4 of Fig. 1, looking in the direction of the arrows 4—4 of that figure and showing on an enlarged scale the intake and exhaust valve pockets and also the passages from the carburetor to the respective intake valves and the passages through which the cooling fluid travels around the exhaust valves to the cylinder block.

Fig. 5 is a fragmentary sectional view of an enlarged scale, taken substantially on the line 5—5 of Fig. 4, showing a metering device which is located in one of the passages of the cooling system;

Fig. 6 is a fragmentary sectional view, taken on the line 4—4 of Fig. 1 but looking in the opposite direction of the arrows 4—4, showing a portion of the carburetor and the connecting passage for the intake manifold;

Fig. 7 is an enlarged sectional view, taken substantially on the line 7—7 of Fig. 1, showing the passages through which the cooling fluid travels within the cylinder block;

Fig. 8 is an enlarged sectional view, taken longitudinally through the cylinder head, having certain parts broken away and showing an intake valve, an exhaust valve and their related parts;

Fig. 9 is a perspective view of the valve operating cam, showing the cam surfaces for operating the intake and exhaust valves;

Fig. 10 is a fragmentary sectional view taken longitudinally of the engine and showing the supply and return of lubricant to and from the various moving parts of the engine;

Fig. 11 is a fragmentary cross-sectional view, taken substantially on the line 11—11 of Fig. 10, showing the method of supplying lubricant to the engine and also the arrangement for the return of lubricant to the reservoir;

Fig. 12 is a detailed view on an enlarged scale of one of the thrust bearings, showing the grooved surfaces for carrying and distributing the oil; and, Fig. 13 is an enlarged fragmentary sectional view showing the venturi for returning oil to the reservoir.

The present invention is a division of my application for Letters Patent of the United States for improvements in Internal combustion engine, filed May 14, 1937, and serially numbered 142,653. Certain features of the present invention are applicable to internal combustion engines whether they are of the usual in-line type of construction, V-type of construction, or of the barrel type of construction, but inasmuch as all features of the invention are particularly adaptable for use in connection with barrel types of engines, the following description of the preesnt invention will be limited to its application to barrel type engines only. From this description those skilled in the art will readily understand the manner in which the invention may be applied to internal combustion engines of other types without requiring specific mention thereof.

Referring to the drawings in which like numerals refer to like parts throughout the several views, there is shown an internal combustion engine of the barrel type having twelve cylinders in two groups of six each. As shown in Fig. 1, the engine is composed of two similar halves. The drive shaft 10 extends through both halves of the engine. The cylinders are equally spaced in a circle around the drive shaft. The drive shaft has mounted on it, or integral with it, an enlarged portion approximately midway between the ends of the shaft, the enlarged portion being positioned between thrust bearings 12. Supported on and carried by the enlarged portion 11 is a T-section driving cam 13, through which the drive shaft is driven from the pistons. Perpendicular surfaces 14 at opposite ends of the enlarged portion 11 provide thrust surfaces for the bearings 12. The shaft 10 extends the entire length of the engine and is provided with journal surfaces 15 arranged to rotate in bearings 16 secured in the cylinder blocks adjacent the outer ends thereof. One end of the drive shaft 10 is provided with an ignition distributor 17 and the other end is arranged as at 18 for connection to a coupling device. The cylinder block is formed in two sections 19 and 20, secured together as at 22. Adjacent the ends of the cylinder block sections 19 and 20 are cylinder heads 24 and 24a. The cylinder block sections are similar as are the cylinder heads, and the description of one in detail will serve to describe similar parts. On the head 24 there is secured a valve cover 25, and also thereon are six exhaust conduits, such as 26, all leading to the annular exhaust manifold 27 arranged concentrically with the axis of the engine. Each of the block halves is provided with six cylinder bores 28 equally angularly arranged about the axis thereof, and each cylinder bore has associated with it one piston, such as 29, of a double-ended piston, designated generally as 30.

Referring still to Fig. 1, the double-ended piston 30 may be seen to comprise a pair of pistons 29 and 32 connected by a connecting portion 33. The pistons 30 may be operatively connected to the cam 13 in the manner shown in my copending application for Letters Patent of the United States for improvements in Internal combustion engine, filed Oct. 29, 1938, the same being a continuation in part of my previously identified application of which the present application is a division, or may be connected as shown herein. In the particular construction shown the connection portion has formed therein a pair of journals 34 and 35 within which there are mounted roller bearings and cam followers, such as 36 and 37, the cam followers contacting with the cam 13 and transforming the energy of the pistons into torque for rotating the cam 13.

The structure of the roller bearings, their journals and cam followers may be seen more clearly in Fig. 2, where there is shown the journal 34 within which there is mounted on needle or roller bearings, such as 38, a shaft 39. This shaft 39 carries the cam follower 36, which, as stated above, contacts with the cam 13. The shaft 39 and roller bearings 38 are retained in position by washers 40 and snap rings 42. Apertures, such as 43, are provided in the washers 40 to permit lubricant to contact the rollers 38. Having roller bearings on both sides of the cam follower 36 gives ample roller bearing surface.

After explosion, the burnt gases are exhausted from the cylinders by the following means. As may be seen in Fig. 1, each cylinder 28 is provided with an exhaust opening 44, which is usually closed by an exhaust valve 45, the exhaust valve opening at times to allow the burnt gases to pass into the exhaust passage 46. From each exhaust passage 46 the gases pass through the corresponding exhaust conduit 26 to the exhaust manifold 27 and escape therefrom through the exhaust opening 47. The exhaust manifold 27, the exhaust outlet 47, and the several exhaust conduits 26 are shown more clearly in Fig. 3.

Means are also provided for supplying fuel to the various cylinders. As may be seen in Fig. 3, I have provided a carburetor 48, which is connected to an intake conduit 49 (Figs. 3 and 4). This intake conduit 49 leads to an annular intake manifold 50 formed adjacent to the drive shaft and concentric therewith and provided with a casing 52, which is formed as a partition surrounding the inlet valves 53 but excluding the exhaust valves 45 and forming radially outwardly directed pockets or passages 63 each connecting the manifold 50 with one of the intake valves 53. One exhaust valve 45 and one inlet valve 53 is associated with each cylinder so as to allow the inlet of fuel and exhaust of burnt gases from each cylinder.

Means are provided for operating the exhaust and inlet valves, which means are shown the most clearly in Figs. 8 and 9. Referring thereto, it may be seen that associated with the cylinder head 24a there is an exhaust valve 45a and an inlet valve 53a. The valve 45a has a valve stem 54, which is urged by a spring 55 to seat the valve 45a. The valve 53a has a valve stem 56, urged by a spring 57 to seat the valve 53a. The stem 54 acting through a conventional tappet 54a bears upon the inner face 58 of the valve cam 59, shown most clearly in Fig. 9, and the valve stem 56 acting through a tappet 56a bears on the outer face 60 of the cam 59. Similarly, all of the exhaust valves have stems bearing through tappets on the inner face, and all of the inlet valves have stems bearing through tappets on the outer face, and the cam thus operates both the exhaust and the inlet valves.

The axes of the intake valves, such as 53a, lie in the surface of a frustrum of a cone, and the ends of the cooperating valve tappets are shaped to conform to the cam surface 58 of the cam 59. The exhaust valves corresponding to valve 45a and their valve stems and tappets are located so that their axes lie in the surface of a frustrum of a cone with the ends of the cooperating valve tappets shaped to co-operate with the cam surface 60 of the cam 59. As shown in Fig. 9, the annular inclined cam surface 58 for the intake valves is combined with the concentric, annular, inclined cam surface 60 for the exhaust valves in a single unitary structure.

Referring again to Fig. 1, it may be seen that each exhaust manifold 27 is tapered to permit the continuous and uniform flow of exhaust gases into the exhaust pipe 62 (Fig. 3). The exhaust conduits 26 may be secured to the cylinder head 24 by means of bolts or studs.

In the operation of the valves, the cylinders fire in regular order in the direction of rotation. The intake valves open in the same order, and gases passing into the intake manifold 50, past the intake valves, are caused to whirl in a rotary swirling action in the short annular manifold, and thus the heavier vapor particles are prevented from settling, because they are thrown outward centrifugally into the valve pockets 63 (Fig. 4).

Means are also provided for cooling the engine. Referring especially to Fig. 4, there is shown a water or other cooling medium inlet 64, through which water is introduced into the annular compartment 65 formed between the partition 52 and the outer casing or wall 66 of the cylinder head 24. The water thus enters the cylinder head and forms a mass around and between the exhaust valves and travels toward the longitudinal center of the engine, passing through ports, such as the port 67. One of the ports 67 is shown more clearly in Fig. 5, wherein it may be seen that the port 67 connects the space 65 with a water-jacket 68 surrounding the cylinders 28. From the jacket 68 (Figs. 1 and 7), the water passes through an outlet 69 into a water conduit 70, leading back to the radiator 72. From the radiator 72, the water is pumped by the pump 73 through the water supply conduit 74 back to the water inlet 64. Thus it will be noted that contrary to conventional practice, in the present case the cooling medium or water is first introduced into the water jacket for the cylinder head, and is then discharged therefrom to the water jacket for the cylinder block.

In each passage 67 is inserted a removable ported metering plug 75, as best shown in Fig. 5, which permits the proper amount of water to flow around the corresponding exhaust valves and into the water jackets for the cylinders. By this arrangement the compartment 65 is maintained continuously filled with water and prevents the possibility of steam collecting in the exhaust cooling compartment. Also by making the passages in the plugs small enough, it is possible to maintain a positive pressure on the water in the jacket for the cylinder head, greater than the pressure on the water in the jacket for the cylinder block, and thus lessen the tendency of steam to form around the head, as well as to insure a proper flow of water around all of the exhaust passages 44 so as to maintain the seats for the exhaust valves properly cool and thus avoid warping of the same. By reason of the fact that the ports 67 are located in the pockets for the exhaust valves, the possibility of excessive hot water collecting in these pockets is eliminated, thus giving more desirable and efficient cooling of the engine. It is also understood that the ports 75 may be varied in size so that a uniform temperature may be maintained throughout by increasing or decreasing the flow of the cooling medium. The fact also that the water heated by the exhaust surrounds the intake manifold 50 insures the maintenance of the fuel at a proper temperature. A steam relief port 67a, smaller than the metering ports 75, connects the compartment 65 in the head with the water-jacket 68 at their uppermost portions to permit any steam that might form in the head under unusual circumstances a ready escape to the outlet 69.

Means are provided for insuring the proper lubrication of all the moving parts of the engine and such means forms the subject-matter of the present invention. Referring to Figs. 10, 11, 12 and 13, and especially to Fig. 11, it may be seen that there is provided an oil reservoir 76, from which oil may flow by a pair of conduits 77 to a central chamber 78 formed in the engine block adjacent to the drive shaft 10 and between the thrust bearing 12 and radial bearing 16 at each end of the engine. As may be seen more clearly in Fig. 10, the drive shaft 10, adjacent to the outlet from the conduit 77, may be but is not necessarily provided with a series of spiral baffles 79 and 80. As may be seen, with the drive shaft 10 rotating in a clockwise direction (as viewed from the left in Fig. 10), the spiral baffles will act to aid in forcing the lubricant in opposite directions from the conduit 77, forcing it to the bearings 15 and 82, and in the opposite direction to the thrust bearings 12. The thrust bearings 12 are each composed of two parts, one fixed with respect to the engine block and the other free to rotate with the shaft 10 and, as shown on an enlarged scale in Fig. 12, the rotatable parts are each provided with a plurality of spiral grooves, such as 84, whereby the oil delivered to the thrust bearings and particularly to the grooves 84 thereof is acted upon by centrifugal force and thrown outwardly therefrom to lubricate the cam followers 36, the roller bearings therefor, the cam 13 and the pistons, during their movement in the cylinders. The flow of lubricant to the passages 84 and subsequent application of centrifugal force to such oil acts in the manner of a centrifugal pump to aid in the circulation of the oil through the system. It will also be understood that by varying the size and/or number of the grooves or passages 84 a means is provided for varying the flow of lubricant into the cam chamber, as these grooves or passages 84 serve as metering passages.

The oil collects in the lower part of the crank case, as at 85 (Figs. 10 and 11), and is forced therefrom, along with some of the gas blowing by the pistons, by pressure in the crank case developed from the blow-by past the pistons. The oil is forced, through a Venturi nozzle 86, into a return conduit 87, from which it flows back to the supply tank 76. In passing out of the Venturi nozzle 86 into the conduit 87, the flow of the oil creates a suction, which draws oil from the opposite ends of the engine, through passages 89 leading thereto as shown in Fig. 13. Thus oil forced towards the ends of the engine by the baffles 80 or otherwise passes outwardly to lubricate the valve mechanism, and eventually collects in pockets, such as 88, whence it passes through the conduits 89 to the outlet at the Venturi nozzle 86, and there by suction is pulled into the conduit 87 and thence forced by pressure to the reservoir. The reservoir 76 is provided with a float valve 90, used to close the vent opening of the reservoir in inverted flying. It is to be understood that oil passed through the journal 15 (Fig. 10) is discharged against the cam 59 and thrown centrifugally against the ends of the valve stems 54 and 56.

It is believed that the operation of the engine will be apparent from the above description. Fuel injected into the cylinders through the intake manifold 50 from the carburetor 48, at times permitted by the opening of the valves 53 as controlled by the cam 59, is exploded by the spark plugs, which may be inserted as at 100 (Fig. 10). The movement of the pistons outward reacts through the central beam, through the cam followers 36, upon the cam 13, and thus rotates the shaft 10. At this point the exhaust valves 45 are opened by the cam 59, and the exhaust gases escape through the exhaust manifold 27. The cam 59 is driven by the shaft 10 and, as stated, operates the exhaust and intake valves. The engine is cooled by the cooling system, previously described, and is lubricated by the lubricating system, also previously described.

It may be noted that by positioning the thrust bearings on each side of the cams 13 and in contact with the opposite ends or shoulders 14 of the enlarged portion 11 of the shaft 10, a minimum length of shaft is located between the thrust bearings. Therefore expansion or contraction of the shaft 10 due to temperature changes will have no appreciable affect on the proper operation of the thrust bearings. The radial bearings 16 and 82 being capable of permitting relative axial movement of the shaft 10 therein, are not affected in any manner by changes in the length of the shaft 10 due to changes of the temperature thereof.

It is to be understood that the above described embodiment of the invention is for the purpose of illustration only, and various changes may be made therein without departing from the spirit of the invention, the scope of which is commensurate with the appended claims.

What is claimed is:

1. In an internal combustion engine of the class having a central drive shaft extending longitudinally thereof, duplicate blocks of cylinders at each end of the engine, each cylinder block having the cylinders thereof arranged with their axes parallel to said shaft and in a circle about the shaft, a piston in each of said cylinders, and means including a cam on said shaft forming an operative connection between the piston and the shaft for effecting rotation of the shaft upon reciprocation of the pistons, the combination with the shaft of a radial shoulder thereon at each side of said cam, a shoulder on each said cylinder block in opposed relation with respect to the shoulder on the corresponding side of said cam, and a thrust bearing arranged between each of said opposed pair of shoulders, means for feeding oil along said shaft to each of said thrust bearings, and said thrust bearings being positioned to discharge lubricant therefrom to said pistons and to said connections between said pistons and said cam.

2. In an internal combustion engine of the barrel type class including a cylinder block providing two circularly arranged groups of cylinders at each end of the engine arranged with their axes parallel to the axis of the engine, a drive shaft concentric with the axis of the engine, a cam on the shaft between the two groups of cylinders, pistons in the cylinders and means interconnecting the pistons and the cams for simultaneous movement, the combination of an axial thrust bearing arranged between the shaft and the cylinder block on each side of the cam, a radial bearing for the shaft in axially outwardly spaced relation from the corresponding thrust bearings on each side of the cam, means for introducing lubricant to the shaft between each radial bearing and its corresponding thrust bearing, said thrust bearing being provided with passages therein for reception of said lubricant and for restricting the flow thereof through said thrust bearing, and said thrust bearing being positioned to discharge lubricant therefrom to said pistons during their normal movement in said cylinders.

3. In an internal combustion engine of the barrel type class including a cylinder block providing two circularly arranged groups of cylinders at each end of the engine arranged with their axes parallel to the axis of the engine, a drive shaft concentric with the axis of the engine, a cam on the shaft between the two groups of cylinders, pistons in the cylinders and means interconnecting the pistons and the cams for simultaneous movement, the combination of an axial thrust bearing arranged between the shaft and the cylinder block on each side of the cam, a radial bearing for the shaft in axially outwardly spaced relation from the corresponding thrust bearings on each side of the cam, means for introducing lubricant to the shaft between each radial bearing and its corresponding thrust bearing, said thrust bearing including a part capable of rotation with said shaft and having passages therein leading from a point adjacent the radially inner edge of the thrust bearing to the radially outer edge thereof, and means for delivering lubricant to said shaft intermediate each thrust bearing and the radial bearing at the corresponding end of the engine for distribution to both said radial bearings and said thrust bearings, the lubricant fed to said thrust bearings being received by said passages and being subjected to centrifugal force therein during operation of the engine to aid in the circulation of lubricant in said engine.

4. In an internal combustion engine of a class including a pair of axially spaced cylinder blocks and an interconnecting casing, a drive shaft rotatably mounted centrally of the cylinder blocks, cylinders in the cylinder blocks, pistons reciprocable in the cylinders and a cam fixed to the shaft in said casing and operatively connected to the piston for receiving driving effort therefrom, the combination with said blocks and shaft of a bearing surrounding said shaft on each side of said cam and an additional bearing surrounding the said shaft on each side of said cam and spaced axially of said shaft outwardly thereof with respect to the corresponding first mentioned bearing, a compartment formed in each of said blocks between each pair of said bearings on the same side of said cam, means for introducing lubricant into said compartments and pumping means in each of said compartments driven by said shaft and acting upon lubricant delivered thereto to force said lubricant from the opposite ends of said compartments.

5. In an internal combustion engine of a class including a pair of axially spaced cylinder blocks and an interconnecting casing, a drive shaft rotatably mounted centrally of the cylinder blocks, cylinders in the cylinder blocks, pistons reciprocable in the cylinders and a cam fixed to the shaft in said casing and operatively connected to the piston for receiving driving effort therefrom, the combination with said blocks and shaft of a bearing surrounding said shaft on each side of said cam and an additional bearing surrounding the said shaft on each side of said cam and spaced axially of said shaft outwardly thereof with respect to the corresponding first mentioned bearing, a compartment formed in each of said blocks between each pair of said bearings on the same side of said cam, means for introducing lubricant into said compartments, and pumping means in each of said compartments driven by said shaft and acting upon lubricant delivered thereto to force said lubricant from the opposite ends of said compartments, the first mentioned bearings comprising thrust bearings operative to transmit axial thrust on said shaft to said cylinder blocks.

6. In an internal combustion engine of a class including a pair of axially spaced cylinder blocks and an interconnecting casing, a drive shaft rotatably mounted centrally of the cylinder blocks, cylinders in the cylinder blocks, pistons reciprocable in the cylinders and a cam fixed to the shaft in said casing and operatively connected to the piston for receiving driving effort therefrom, the combination with said blocks and shaft of a bearing surrounding said shaft on each side of said cam and an additional bearing surrounding the said shaft on each side of said cam and spaced axially of said shaft outwardly thereof with respect to the corresponding first mentioned bearing, a compartment formed in each of said blocks between each pair of said bearings on the same side of said cam, means for introducing lubricant into said compartments, pumping means in each of said compartments driven by said shaft and acting upon lubricant delivered thereto to force said lubricant from the opposite ends of said compartments, the first mentioned bearings comprising thrust bearings operative to transmit axial thrust on said shaft to said cylinder blocks, each of said thrust bearings including a member having a face in a plane directed perpendicularly to the axis of said shaft, and said face having passages therein arranged to receive lubricant from the corresponding said compartment and meter the flow thereof into said casing.

7. In an internal combustion engine of a class including a pair of axially spaced cylinder blocks and an interconnecting casing, a drive shaft rotatably mounted centrally of the cylinder blocks, cylinders in the cylinder blocks, pistons reciprocable in the cylinders and a cam fixed to the shaft in said casing and operatively connected to the piston for receiving driving effort therefrom, the combination with said blocks and shaft of a bearing surrounding said shaft on each side of said cam and an additional bearing surrounding the said shaft on each side of said cam and spaced axially of said shaft outwardly thereof with respect to the corresponding first mentioned bearing, a compartment formed in each of said blocks between each pair of said bearings on the same side of said cam, means for introducing lubricant into said compartments, pumping means in each of said compartments driven by said shaft and acting upon lubricant delivered thereto to force said lubricant from the opposite ends of said compartments, the first mentioned bearings comprising thrust bearings operative to transmit axial thrust on said shaft to said cylinder blocks, said thrust bearings each including a rotatable member having at least one passage in a radial face thereof for reception of lubricant from the corresponding of said compartments, said passage leading from the inner face of said member to the radial outer face thereof whereby to subject lubricant received in said passage to the effect of centrifugal force whereby to aid said pumping means in the circulation of lubricant in said engine.

8. In an internal combustion engine of a class including a pair of axially spaced cylinder blocks and an interconnecting casing, a drive shaft rotatably mounted centrally of the cylinder blocks, cylinders in the cylinder blocks, pistons reciprocable in the cylinders and a cam fixed to the shaft in said casing and operatively connected to the piston for receiving driving effort therefrom, the combination with said blocks and shaft of a bearing surrounding said shaft on each side of said cam and an additional bearing surrounding the said shaft on each side of said cam and spaced axially of said shaft outwardly thereof with respect to the corresponding first mentioned bearing, a compartment formed in each of said blocks between each pair of said bearings on the same side of said cam, means for introducing lubricant into said compartments, and a pair of oppositely spiralled members secured to said shaft within each of said compartments and rotatable with said shaft, said spiral members acting upon lubricant delivered to said compartment to force said lubricant towards the opposite ends of said compartments.

9. In an internal combustion engine of the class having a cylinder block providing a plurality of cylinders, a piston reciprocable in each cylinder, a casing secured to the cylinder block and adapted to contain a body of lubricating oil and to receive gas blowing by said piston during operation of said engine, a drive shaft rotatably mounted in the casing and a driving connection between the pistons and the drive shaft whereby some pistons move outwardly in their cylinders while others move inwardly in their cylinders, the combination with said casing of a discharge connection adjacent the lower portion thereof in position to receive oil from said body of oil and forming the sole normally open escape means for fluids within said casing, a reservoir, and a connection between said discharge connection and said reservoir whereby said gas blowing by said pistons during operation of said engine acts upon lubricating oil collecting in the lower portion of said casing to force the same through said discharge connection and into said reservoir.

10. In an internal combustion engine of the class including a pair of cylinder blocks arranged in axially spaced relation secured and sealed together by means of a casing, said casing adapted to contain a body of lubricating oil and to receive gas blowing by said pistons during operation of said engine, having a drive shaft rotatably mounted centrally thereof, pistons reciprocable in the cylinder blocks and means in said casing forming a driving connection between said shaft and said pistons, the combination with said casing and cylinder blocks of a discharge connection adjacent the lower part of said casing in position to receive oil from said body of oil and forming the sole normally open escape means for fluid collecting in said casing, an additional casing at the end of each said cylinder blocks opposite the first mentioned casing, an oil reservoir, a conduit extending between said connection and said oil reservoir, a nozzle operatively associated with said connection and projecting into said conduit in at least partly spaced relation with respect to the inner walls thereof, an additional conduit connecting the interior of each of the second mentioned casings with the first mentioned conduit at a point adjacent said nozzle, whereby said gas blowing by said pistons into the first mentioned casing and escaping through said connection and nozzle creates a suction in the second mentioned conduits tending to withdraw fluid therefrom and to deliver said fluid to said reservoir.

11. In an internal combustion engine of the class including a cylinder block having a cylinder and a piston reciprocable in said cylinder, a casing sealed to said cylinder block and adapted to contain a body of lubricating oil and to receive gas blowing by said piston during operation of said engine, a drive shaft rotatably mounted in said casing and a connection at least partially within said casing connecting said piston and said drive shaft for driving said drive shaft from said piston, the combination with said casing of a discharge connection adjacent the bottom of said casing in position to receive oil from said body of oil and forming the sole normally open means for the escape of fluid from said casing, an oil reservoir, a conduit connecting said oil reservoir with said discharge connection, an ejector at the junction of said discharge connection and said conduit and adapted to be operated by said gas blowing by said piston into said casing and escaping from said casing through said discharge connection, a second casing part on said engine in which lubricant is adapted to collect, and a tube connecting the low pressure zone of said ejector with said second casing part.

12. In an internal combustion engine of the class including a cylinder block having a plurality of cylinders therein and a piston reciprocable in each of said cylinders, a casing sealed to said cylinder block and adapted to contain a body of lubricating oil and to receive gas blowing by said piston during operation of said engine, a drive shaft rotatably mounted in the casing, and an operative connection between said pistons and said drive shaft for imparting driving movement to said driving shaft upon reciprocation of said pistons, said connection being so constructed and arranged that some of said pistons are moving outwardly of their cylinders while others are moving inwardly of their cylinders, the combination with said casing of a discharge connection adjacent the lower end thereof in position to receive oil from said body of oil and, an oil reservoir positioned above the normal level of a wearing surface of said engine, means above the normal level of lubricant in said reservoir for the escape of fluid under pressure therefrom, and a connection between said reservoir and said discharge connection whereby said gas blowing past said piston during operation of said engine creates a pressure in said casing acting upon any accumulation of lubricant in said casing overlying said discharge opening to force such lubricant through said conduit and into said reservoir, and a discharge connection from said reservoir to said wearing surface of said engine.

13. In an internal combustion engine having a central drive shaft, pairs of opposed cylinders arranged circularly about said shaft with their axes substantially parallel to the axis of said shaft, double ended pistons in each pair of opposed cylinders, and a cam on said shaft engaged by said pistons and adapted to be rotated thereby, the combination of a pair of spaced thrust bearings for said shaft disposed on opposite sides of said cam, a radial load bearing for said shaft disposed on each side of said cam and in outwardly spaced relation to the corresponding said thrust bearing, a substantially closed passageway connecting each said radial load bearing with its corresponding thrust bearing and means for introducing lubricant to said passageways, said thrust bearings being so constructed and arranged as to feed oil therethrough to the wearing surfaces between said cam and pistons.

KARL L. HERRMANN.